3,335,168
CYANO-HYDROXY-NAPHTHOIC ACIDS
Joseph W. Dehn, Jr., Great Neck, N.Y., and John J. Maitner, Hazlet, N.J., assignors to Interchemical Corporation, New York, N.Y., a corporation of Ohio
No Drawing. Filed Sept. 9, 1964, Ser. No. 395,294
3 Claims. (Cl. 260—465)

This invention relates particularly to the dye intermediates, 7-cyano-3-hydroxy-2-naphthoic acid and 7-cyano-3-hydroxy-2-naphthoic-acid - 2',4' - dimethoxy - 5' - chloroanilide.

This application is a continuation-in-part of Ser. No. 152,613 filed Nov. 15, 1961, now U.S. Patent No. 3,153,032.

Already known are a number of fast pigments derived from naphthol AS, which is the anilide of 3-hydroxy-2-naphthoic acid. Most of them have various diazo components and substituents in the anilide portion. Relatively little work has been reported on the synthesis of compounds having substituents in the naphthalene nucleus.

It has now been found that certain 7-bromo- and 7-cyano-naphthalene-ring-substituted naphthol AS compounds form maroon pigments superior to the best commercial maroon pigments in lightfastness, dry-cleaning fastness, and color strength. These pigments were also evaluated against the corresponding compounds having no substituent in the 7- position. The effect of the 7-bromo and 7-cyano substitutions was to increase the lightfastness over that of the analogous unsubstituted pigments. The shade was shifted towards the blue or violet.

The pigments may be synthesized for example by the azo coupling of 7-cyano- or 7-bromo-3-hydroxy-2-naphthoic-acid-2',4'-dimethoxy - 5'-chloroanilide to 5-nitro-2-methoxybenzene diazonium chloride, or to 5-N, N-diethyl sulfonamido-2-methoxybenzene diazonium chloride. For comparison, similar compounds having only H in the 7-position were also made. The cyano compounds were made from the corresponding bromo compounds at the naphthoic acid stage, e.g., 7-bromo-3-hydroxy-2-naphthoic acid was preferably reacted with cuprous cyanide by refluxing in 2-methyl-5-ethyl pyridine to give 7-cyano-3-hydroxy-2-naphthoic acid. This product, reacted with the appropriate arylamine in the presence of phosphorus trichloride gave 7-cyano-3-hydroxy - 2 - naphthoic - acid-2',4'-dimethoxy-5-chloroanilide, which was then coupled to a suitable diazonium chloride.

INTERMEDIATES

A. *4,7-dibromo-3-hydroxy-2-naphthoic acid.*—2900 g. of concentrated sulfuric acid were placed in a 5-liter 3-neck flask equipped with stirrer, thermometer, dropping funnel, and Claisen adapter. The outlet was connected to 2 gas-washing bottles in series containing 1760 g. of 20% oleum. 564 g. of 3-hydroxy-2-naphthoic acid were gradually added to the flask now maintained at 0–3° C. The solid was allowed to dissolve. Over a period of 3 hours 500 g. of bromine were added dropwise, the temperature now being kept at −10° to −2° C. Any hydrogen bromide evolved was oxidized back to bromine in the oleum. The oleum in the gas-washing bottles was added slowly at −10° to −2° C. to the reaction mixture, which was then stirred overnight, the ice bath gradually melting and the flask eventually reaching room temperature. 787 g. of concentrated sulfuric acid and 875 g. of 20% oleum were added to the mass, which had solidified, in order to achieve a consistency suitable for stirring. The mixture was drowned in a mixture of 13 kilograms of ice and 7.5 kilograms of water. The yellow precipitate was filtered and washed until the wash water was neutral to Congo red. The yield of 968 g. was 93.3% of the theoretical. The melting point was 245–248° C.

In another run a yield of 960 g. (92.5% theoretical) was obtained; the melting point was 240–244° C.

Recrystallization from ethanol raised the melting point to 251–253° C.

B. *7-bromo-3-hydroxy-2-naphthoic acid.*—207 g. (1.600 moles) of 4,7-dibromo-3-hydroxy-2-naphthoic acid were stirred into 680 ml. of hot water in a 2-liter beaker. 26 g. (.630 mole) of sodium hydroxide in 65 ml. of water were added and the resulting mixture transferred to a 1600-ml. autoclave together with 35 g. of sodium carbonate (.33 mole) and 108 g. (.86 mole) of sodium sulfite. The autoclave was closed and the mass allowed to stand overnight. Heat was then applied to produce a temperature of 150° to 160° C. for 8 hours, the mass being stirred continuously. A maximum pressure of 110 lbs. gauge was reached. The reaction mass was allowed to cool and stand overnight. It was then transferred to a 2-liter beaker, cooled to 10° C., filtered with suction, and washed with 2 liters of 5% sodium chloride solution until the washings were colorless.

The yellow, solid sodium salt was dissolved in 4000 ml. of boiling hot water and filtered to remove a small amount of insoluble matter. The clear amber filtrate was transferred to a 5000-ml. 3-neck flask and then acidified, at a temperature of 80° C. by gradually adding dropwise 250 ml. of 2.5 M hydrochloric acid. The product was filtered, washed free of acid, and oven dried. The yield amounted to 147 g. (92% of theory). Melting point was 262–264°. When purified by recrystallization from 2 liters of glacial acetic acid the melting point was 269–271° C.

The foregoing preparation was repeated. The yield was 93% of theory and the melting point 267–270° C. On recrystallization the melting point was 269–271° C.

C. *7-cyano-3-hydroxy-2-naphthoic acid.*—The addition of 13.35 g. (.050 mole) of 7-bromo-3-hydroxy-2-naphthoic acid to 109 g. (0.90 mole) of 2-methyl-5-ethyl pyridine was followed by the addition of 5.37 g. (.060 mole) of cuprous cyanide. The reactants were refluxed 1 hour at 173° C. and heating was continued with constant stirring for 29 hours more. The mixture was cooled and allowed to stand overnight. The precipitate was filtered and washed with 200 ml. of ether. The filter cake was placed in 200 ml. water and 20 ml. of concentrated hydrochloric acid were added while stirring. The suspension, acid to Congo red, was stirred 1 hour longer, filtered, washed until neutral to litmus, and dried in the oven at 45° C. The light yellow solid weighed 7.20 g., a yield equivalent to 67.6% of theory. Melting point was 254–257° C. (More solid could be obtained by diluting the filtrate with water and acidifying.) The crude product was recrystallized from 600 ml. of methyl alcohol to give a 4.88 g. yield of light yellow crystals of M.P. 258–260° C. A mixed melting point of this with the 7-bromo starting compound (M.P. 263–267°) showed a substantial depression (mixed M.P. 235–244° C.), indicating that another species had been formed. Infrared spectroscopy showed the presence of a cyano group. The recrystallized material analyzed at C=66.09%, H=3.48%, N=6.35%. Theoretical for $C_{12}H_7O_3N$ is C=67.60%, H=3.31%, and N=6.57%.

D. *7-cyano-3-hydroxy-2-naphthoic - acid-2',4'-dimethoxy-5'-chloroanilide.*—12.9 g. (.060 mole) of the 7-cyano-3-hydroxy-2-naphthoic acid from (c) were thoroughly mixed with 250 ml. of dry toluene and 11.1 g. (.059 mole) of 2,4-dimethoxy-5-chloroaniline. 4.2 g. (.031 mole) of phosphorus trichloride were added dropwise over a period of 30 minutes at 60°–65°, stirring being continued. The mixture was slowly heated to the reflux point and maintained there for 24 hours. It was then cooled to room temperature. The green solid was filtered off, suspended in 275 ml. water, treated with 3.3 g. of sodium carbonate, distilled to remove the remaining toluene, filtered hot, washed to neutrality, and dried at 45° C. 14 g. of green solid were obtained corresponding to a yield of 61% of the theoretical. Melting point was 266–273° C. The compound was dissolved in a solution of 400 ml. ethyl alcohol, 30 ml. water, and 4.4 g. sodium hydroxide. The resulting green solution was filtered and then acidified by dropwise addition of 13 ml. of 37% hydrochloric acid in 35. ml. of water. After filtering, washing with ethyl alcohol and water, and drying at 45° C., there was obtained a yellow solid (12 g.) having a melting point of 272–274° C. Recrystallization from orthodichlorobenzene raised the melting point to 276–278° C. Analysis showed C=61.79%, H=4.00%, N=7.29%. Theory for $$C_{20}H_{15}O_4N_2Cl$$

is C=62.74, H=3.94, N=7.31.

E. *7-bromo-3-hydroxy - 2 - naphthoic acid-2',4'-dimethoxy-5'-chloroanilide.*—500 ml. toluene, 53.4 g. of 7-bromo-3-hydroxynaphthoic acid, and 37.5 g. of 2,4-dimethoxy-5-chloroaniline were heated to remove moisture; 100 ml. toluene were distilled off. 13.75 g. of phosphorus trichloride were added dropwise over a period of 45 minutes, the temperature being 60–68° C. Heat was gradually increased and the material allowed to reflux 27 hours at 112° C. 11 g. of sodium carbonate and 1 liter of water were added. Toluene was removed by steam distillation. The product was filtered, washed to neutrality and oven dried at 45° C. The 69.7 g. of a light green crystalline solid recovered represented 80% of the theoretical yield. The (shrink point) M.P. was 235–238° C. The compound was dissolved in alcoholic NaOH. The solution was filtered and then acidified with hydrochloric acid. The resulting precipitate was filtered, washed with 100 ml. ethanol and 700 ml. water, and oven dried at 45° C. The yield was 68% of theory. Melting point was 260–263° C.

DIAZONIUM SALTS

F. *5-nitro-2-methoxybenzene diazonium chloride.*—16.80 g. of 5-nitro-2-methoxyaniline were dissolved in 22.4 ml. of 37% hydrochloric acid and 150 ml. of water by warming to 70° C. The soltuion was cooled with ice and diazotized with 7.40 g. of sodium nitrite in 20 ml. water. The diazo solution was filtered and 6.8 g. acetic acid added.

G. *5-N,N - diethylsulfonamido-2-methoxy-benzene diazonium chloride.*—25.8 g. of 5-N,N-diethylsulfonamido-2-methoxy aniline were diazotized in a similar way.

PIGMENTS

*Example 1.—Azo pigment from 7-bromo-3-hydroxy-2-naphthoic-acid-2',4'-dimethoxy-5'-chloroanilide and 5-nitro-2-methoxybenzene diazonium chloride*

8.73 g. (.020) of compound E were suspended in 100 ml. of ethanol and 2.10 g. NaOH in 10 ml. water added. The solution was filtered and added gradually to .02 mole of the compound F at 0° to 3° C. Stirring was continued overnight at room temperature. The material was then heated to 75° C. within 30 minutes, filtered hot, washed to neutrality, and dried at 45° C. The yield of bluish-red solid amounted to 90% of theory. The melting point was above 300° C.

*Example 2.—Azo pigment from 7-cyano-3-hydroxy-2-naphthoic-acid-2',4'-dimethoxy - 5' - chloroanilide and 5-nitro-2-methoxybenzene diazonium chloride*

3.82 g. (.010 mole) of product D were suspended in 70 ml. of ethanol. 25 ml. of 4% NaOH were stirred in at room temperature. The solution was filtered to remove impurities. 60 ml. (.010 mole) at 0° C. were put into a 1000-ml. beaker resting in an ice bath. The solution of F was then added dropwise over a period of 45 minutes at 0 to 3° C. while stirring the mixture. Stirring was continued overnight at room temperature. The suspension was next heated to 75° C. over a period of 30 minutes, a temperature of 75 to 80° C. being maintained for 30 minutes more. The product was filtered hot, washed to neutrality with hot water, and dried at 45° C. A yield of 5.3 g. (95% of theory) was obtained of a maroon pigment, which displayed lightfastness and resistance to washing and dry-cleaning superior to the similar compound having hydrogen instead of CN in the 7-position.

*Example 3.—Azo pigment from 7-cyano-3-hydroxy-2-naphthoic-acid-2',4'-dimethoxy-5'-chloroanilide and 5-N,N-diethylsulfonamido-2 - methoxybenzene diazonium chloride*

These components were coupled by a method similar to that of Example 2. A maroon pigment was thus produced in 94% yield.

*Example 4.—Azo pigment from 7-bromo-3-hydroxy-2-naphthoic-acid-2',4'-dimethoxy-5' - chloroanilide and 5-N,N-diethylsulfonamido-2-methoxybenzene diazonium chloride*

These components were coupled by a method similar to that of Example 1. The yield was 93% of theory.

In these pigments the coupling is always in a position ortho to the OH group of the naphthol AS nucleus.

Comparative lightfastness of the pigments are shown in the table following. The odd-numbered pigments are the 7-substituted compounds, while the even-numbered pigment following each one is the corresponding compound having no 7-substituent.

| Pigment | Color | Lightfastness on Cellulose Acetate Film in Hours |
|---|---|---|
| 1. Example 1 | Red-Violet | >200 (¼%) |
| 2. Ditto without 7-Br | Scarlet | <100 (¼%) |
| 3. Example 4 | Red-Violet | >200 (¼%) |
| 4. Ditto without 7-Br | Bluish-Red | 100 (1%) |
| 5. Example 2 | Maroon | >200 (¼%) |
| 6. Ditto without 7-CN | Scarlet | <100 (¼%) |
| 7. Example 3 | Maroon | >200 (1%) |
| 8. Ditto without 7-CN | Bluish-Red | 100 (1%) |

The color strength, washfastness, and fastness to dry-cleaning of the odd-numbered pigments were very good. Similar pigments with methoxy substitution in the 7-position were less lightfast than even the 7-unsubstituted compounds.

What is claimed is:
1. A substituted naphthoic acid selected from the group consisting of
   (a) 7-cyano-3-hydroxy-2-naphthoic acid and
   (b) 7-cyano-3-hydroxy-2-naphthoic-acid-2',4' - dimethoxy-5'-chloroanilide.
2. 7-cyano-3-hydroxy-2-naphthoic acid.
3. 7-cyano-3-hydroxy-2-naphthoic-acid-2',4' - dimethoxy-5'-chloroanilide.

No references cited.

CHARLES B. PARKER, *Primary Examiner.*

DOLPH H. TORRENCE, *Assistant Examiner.*